(12) United States Patent
Murdock et al.

(10) Patent No.: US 11,533,701 B2
(45) Date of Patent: Dec. 20, 2022

(54) TRIPWIRE-BASED GEOLOCATION SYSTEM

(71) Applicant: Alarm.com Incorporated, Tysons, VA (US)

(72) Inventors: John Murdock, Arlington, VA (US); Jasper Bingham, Washington, DC (US); Allen Chien, Fairfax, VA (US); Stephen Scott Trundle, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 46 days.

(21) Appl. No.: 17/307,718

(22) Filed: May 4, 2021

(65) Prior Publication Data

US 2021/0392611 A1 Dec. 16, 2021

Related U.S. Application Data

(60) Provisional application No. 63/037,053, filed on Jun. 10, 2020.

(51) Int. Cl.
*H04W 64/00* (2009.01)
(52) U.S. Cl.
CPC .................... *H04W 64/006* (2013.01)
(58) Field of Classification Search
CPC ......... H04W 4/80; H04W 4/021; H04W 4/60; H04W 4/029; H04W 88/08; H04W 24/04; H04W 88/085; H04W 4/023; H04W 4/027; H04W 4/38; H04W 64/00; H04W 24/06; H04W 4/33; H04W 4/70; H04W 72/048; H04W 64/003; H04W 4/026; H04W 28/0226; H04W 16/225
See application file for complete search history.

(56) References Cited

U.S. PATENT DOCUMENTS

| 2013/0031047 | A1 | 1/2013 | Boazi et al. |
| 2017/0221289 | A1* | 8/2017 | Trani ...................... H04W 4/33 |
| 2020/0049563 | A1 | 2/2020 | Fadell et al. |

OTHER PUBLICATIONS

PCT International Search Report and Written Opinion in International Application No. PCT/US2021/035868, dated Sep. 8, 2021, 7 pages.

(Continued)

*Primary Examiner* — Kwasi Karikari
(74) *Attorney, Agent, or Firm* — Fish & Richardson P.C.

(57) ABSTRACT

Methods, systems, and apparatus, including computer programs encoded on a non-transitory computer storage medium, for receiving user-defined routes, each user-defined route including a tripwire of multiple tripwires and a direction, where each user-defined route includes an action of multiple actions executed by a sub-system of a home monitoring system, detecting a first signal at a first tripwire including a first direction, determining a set of user-defined routes including the first tripwire and the first direction, detecting a second signal at a second tripwire including a second direction, determining a particular user-defined route of the set of user-defined routes including the first tripwire and the first direction and the second tripwire and the second direction, determining an action executed by a sub-system of the home monitoring system for the particular user-defined route traversed by a user, and triggering execution of the action based on the second signal at the second tripwire.

20 Claims, 5 Drawing Sheets

(56) References Cited

OTHER PUBLICATIONS

Wmata.com [online], "Washington Metropolitan Area Transit Authority API," available on and before Aug. 2010, retrieved on Sep. 3, 2021, retrieved from URL<https://developer.wmata.com/>, 2 pages.

* cited by examiner

Home Automation Setup Application 118

Route #2 : Work to Home, [weekdays]

What would you like to tie into this route?

- [x] HVAC settings
- [x] Lights
- [ ] Sprinkler System (cut-off)
- [ ] Security System
- [ ] Unlock Doors Transit Schedule
[Imported from Transit App]

Routes between Work and Home Departing between 5:00 – 6:00 PM

6 LINE
5:15 PM Depart → 6 PM Arrive

4 LINE EXPRESS
5:18 PM Depart → 5:40 PM Arrive

Click for more

150

Start 116
Tripwire D
126
154
Tripwire E
Tripwire F
End 124

152

FIG. 1B

TRIPWIRE-BASED GEOLOCATION SYSTEM

CROSS-REFERENCE TO RELATED APPLICATIONS

This application claims priority to U.S. application Ser. No. 63/037,053, filed on Jun. 10, 2020, which is incorporated herein by reference in its entirety.

TECHNICAL FIELD

This disclosure relates generally to location tracking services.

BACKGROUND

Many people utilize location-tracking services for monitoring their location, where the location tracking services can utilize one or more geofences that can trigger actions as the user crosses the boundary.

SUMMARY

Techniques are described for utilizing tripwires to optimize tracking of a person they are arriving from a point of origin to a home enabled with home automation functionality.

More specifically, techniques are described for a tripwire-based geolocation system to generate and execute tripwires along a user's route, where an action to be performed by a sub-system of a home monitoring system can be executed based on a user crossing a tripwire along the pre-defined route. Estimated time of arrival can be used by a home monitoring system, for example, to engage home automation functionality (e.g., HVAC system, security system, appliance controls, etc.).

In general, one innovative aspect of the subject matter described in this specification can be embodied in methods that include receiving multiple user-defined routes, each user-defined route including a tripwire of multiple tripwires and a direction for the tripwire, where each user-defined route of the multiple user-defined routes includes an action of multiple actions executed by a sub-system of a home monitoring system. A first signal is detected at a first tripwire of the multiple tripwires, the first tripwire including a first direction. A set of user-defined routes is determined from the multiple user-defined routes, including the first tripwire and the first direction. A second signal is detected at a second tripwire of the multiple tripwires, the second tripwire including a second direction. A particular user-defined route of the set of user-defined routes is determined from the first signal and the first tripwire and the second signal and the second tripwire including the first tripwire and the first direction and the second tripwire and the second direction traversed by a user. An action executed by the sub-system of the home monitoring system for the particular user-defined route traversed by the user is determined, and execution of the action is triggered based on the second signal at the second tripwire.

Other embodiments of this aspect include corresponding systems, apparatus, and computer programs, configured to perform the actions of the methods, encoded on computer storage devices.

These and other embodiments can each optionally include one or more of the following features. In some implementations, the first tripwire includes a first geolocated region along the particular user-defined route at a differentiating point between the particular user-defined route and a different user-defined route, and the second tripwire includes a second geolocated region along the user-defined route, where an amount of travel time for the user to traverse from the second tripwire to an endpoint of the particular user-defined route, and where the amount of travel time corresponds to an amount of time to execute the action by the sub-system of the home monitoring system.

In some implementations, determining, from the first signal and the first tripwire and the second signal and the second tripwire, the particular user-defined route of the set of user-defined routes and the action traversed by the user includes determining that the first signal indicates movement through the first geolocated region defined by first tripwire in the first direction, and determining that the second signal indicated movement through the second geolocated defined by the second tripwire in the second direction, where the first signal and the first tripwire and the second signal and the second tripwire define a user-defined route that is different from each other user-defined route of the multiple user-defined routes.

In some implementations, movement through the first geolocation region in the first direction includes entering the first geolocated region from a first side or first curvature of the first geolocated region and exiting from a second side or second curvature of the first geolocated region, and movement through the second geolocation region in the second direction includes entering the second geolocated region from a third side or a third curvature of the second geolocated region and exiting from a fourth side or fourth curvature of the second geolocated region.

In some implementations, movement through the first geolocation region in the first direction includes a directionality of movement by the user through the first geolocated region to trigger the first tripwire. The movement through the first geolocation region in the first direction can include directionally invariant movement by the user through the first geolocated region to trigger the first tripwire.

In some implementations, the first geolocated region and the second geolocated region include an intersection or an area of a roadway.

In some implementations, for a particular user-defined route including a particular action executed by the sub-system of the home monitoring system the methods include: determining an amount of time to execute the particular action by the sub-system of the home monitoring system, determining a candidate geolocated region for a particular tripwire and a direction for the particular tripwire for the particular user-defined route based on an amount of travel time from the candidate geolocated region to an end point of the particular user-defined route, and providing, to a user in a user interface, the candidate geolocated region for the particular tripwire.

In some implementations, the amount of travel time from the candidate geolocated region for the particular tripwire is equal or greater than the amount of time to execute the action by the sub-system of the home monitoring system. Determining the amount of travel time from the candidate geolocated region to the end point can include: collecting multiple travel times for the user to traverse the user-defined route from a start point to the end point, and determining the candidate geolocated region based on an average travel time from the candidate geolocated region to the end point along the user-defined route.

In some implementations, the methods further include providing, to a user on a user device, an alert notifying the user of the execution of the action based on the second signal at the second tripwire, and receiving, from the user on the user device, user feedback in response to the alert.

In some implementations, multiple user-defined routes include transit routes for public transit, and the tripwire for each user-defined route includes a transit exchange point along a particular transit route of the public transit.

Other embodiments of this aspect include corresponding systems, apparatus, and computer programs, configured to perform the actions of the methods, encoded on computer storage devices.

The techniques described in this disclosure provide one or more of the following advantages. Setting tripwires along a user route can be used to engage home automation services in a timely manner, such that home automation services are not engaged too soon or too late with respect to an expected arrival time, thereby improving energy usage, e.g., HVAC system that is not ramped up unnecessarily early and sets climate control settings long before a user arrives at home. Moreover, tripwires along a user route can be used to generate and provide notifications to other users, e.g., of an imminent arrival of a particular user. The set of tripwires can be generated which include personalized actions to be executed by particular subsystems depending on a user that is triggering the tripwires, e.g., a husband and wife may have a same commute but different actions associated with their commute.

In some embodiments, tripwires set along a user route can be used to generate home activity summaries for the commuting user, e.g., a "highlights reel," which can inform the commuting user of activity within and surrounding the home.

By defining tripwires as geo-located regions that are highly localized, e.g., an intersection, a roadway, a train station, etc., users can trigger targeted, automated actions when crossing the precise geographical tripwires and avoid triggering the tripwires unintentionally and generating false positive triggers. In some implementations, two or more tripwires can be defined along a user route, where the system can detect a user crossing the two or more tripwires to recognize that the user is on a particular user route.

In some implementations, third party data, e.g., public transit data, flight tracking data, can be utilized to generate tripwires associated with actions to be performed by subsystems of the home monitoring system and defined along a route associated with the third party data. A user can define a route that utilizes one or more forms of transit, e.g., train, subway, bus, walking/biking, etc., and import schedules and maps from third-party sources. The user's real-time location relative to a tripwire can be determined using the transit data in combination with or instead of using global positioning system (GPS) data from the user's phone.

The details of one or more implementations are set forth in the accompanying drawings and the description below. Other features will be apparent from the description and drawings, and from the claims.

BRIEF DESCRIPTION OF THE DRAWINGS

FIG. 1B is a schematic of an example graphical user interface for a tripwire geolocation system.

DETAILED DESCRIPTION

Figure 1A:
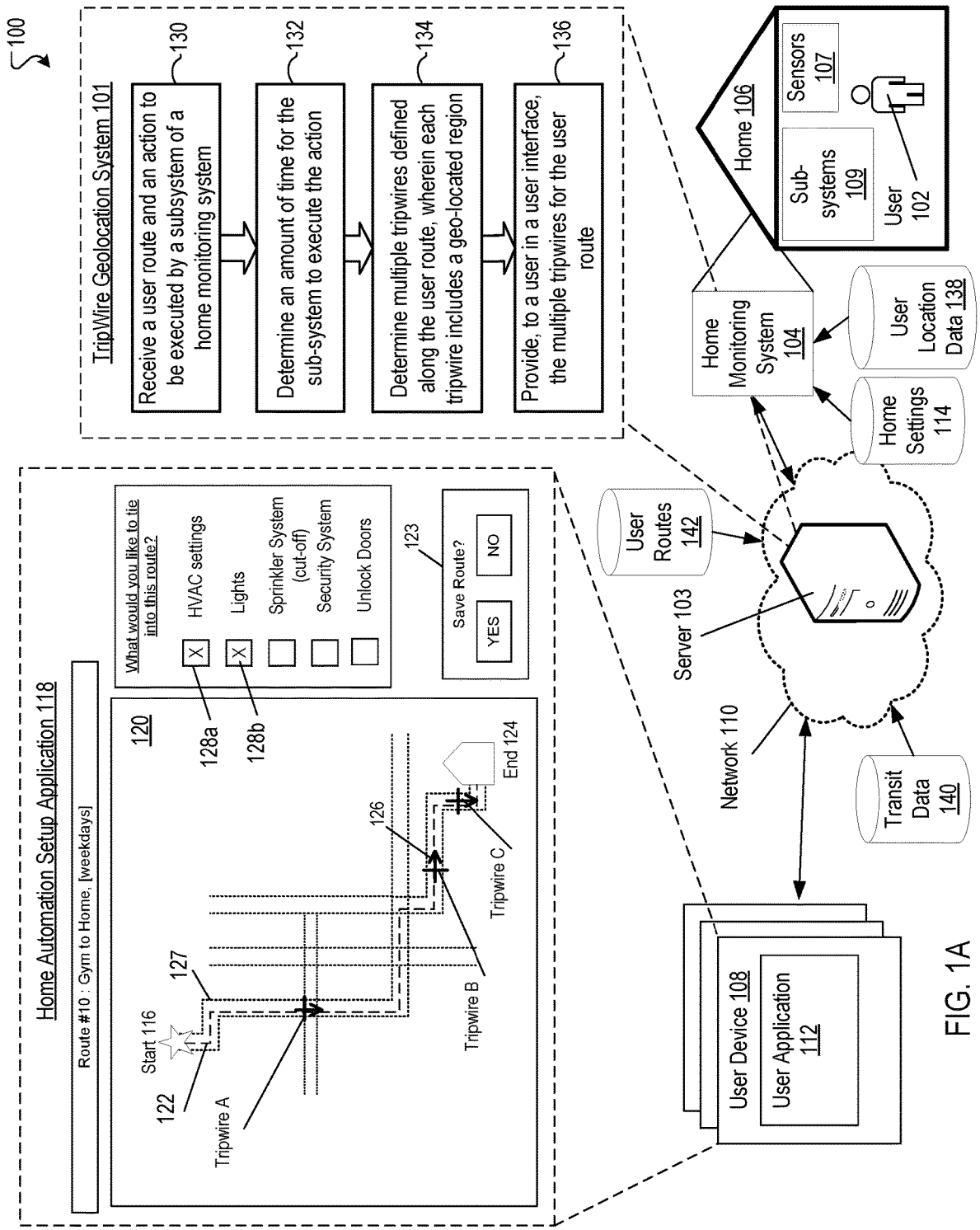
FIG. 1A is an example operating environment for a tripwire geolocation system.

Techniques are described for utilizing tripwires to optimize tracking of a person as they are arriving from a point of origin to a home enabled with home automation functionality. Transit data reflecting a user's location along a particular route, e.g., GPS data, public transit data, flight tracker data, etc., can be utilized to trigger tripwires along the particular route associated with actions at a home enabled with home automation functionality. A tripwire is a geolocated region, where a signal at a tripwire can be a detection that a user is traversing the geolocation region. The tripwire is highly localized, e.g., defined by an intersection, a line across a roadway, an area of a roadway, or the like. Tripwires can include a direction of transit, in other words, tripwires can be sensitive to a direction that a user traverses the tripwire. For example, a direction can be a user crossing the tripwire while driving southbound on a roadway. In another example, a direction can be a user crossing the tripwire while on an eastbound train through a transit station on a subway system.

Tripwires can be compatible with multiple forms of transit, e.g., plane, train cars, bikes, etc., where a particular tripwire can be defined using transit data, e.g., flight tracker data, train schedules, rather than a physical geographical location. Each tripwire can be highly localized to a particular location, e.g., a line, circle, oval, polygonal shape, across a roadway, intersection or the like, and include a defined direction of travel, e.g., orthogonal to the tripwire. Multiple tripwires defined along a user route can be utilized to determine a user's intended route of travel, to differentiate a particular route from multiple possible routes.

A graphical user interface allows a user to input/alter a particular route and define an action to be executed by a subsystem, e.g., HVAC, lighting, security, etc., of a home monitoring system. An amount of time for the subsystem to execute the action is determined and multiple tripwires are defined along the user's route. At least one of the multiple tripwires can be a trigger to execute the action for the subsystem, e.g., to turn on/off lights, ramp up/down a climate control setting of the HVAC system, or the like. Each of the tripwires is a geo-located region on the user's route, e.g., a line, oval, or other shape, that is well-defined and localized to the user's route.

FIG. 1 is an example operating environment 100 for a tripwire geolocation system 101 including a user 102 and home monitoring system 104 for a home 106. User 102 can have a user device 108, for example, a mobile phone, tablet, or another mobile device including location tracking services e.g., using global position system (GPS), control plane locating, or the like.

Home 106 can be, for example a residence (e.g., a single-family home, a town house, a condominium, or an apartment). In some implementations, a home 106 can be a commercial property (e.g., a business, government building, or a public space). Home 106 can have one or more users 102, for example, a homeowner, a resident of the home 106, a visitor to the home 106, an employee of the home 106, or the like.

Home 106 can include a home monitoring system 104. In some implementations, the home monitoring system 104, the tripwire geolocation system 101, or a combination of the two systems can be hosted on one or more servers 103. In some implementations, a portion or all of servers 103 are cloud-based servers.

A home monitoring system 104 can include a set of sensors 107 located in or surrounding the home 106, including, for example, cameras, motion detectors, window/door sensors, and keypad access door locks. For example, cameras that capture video or still images of an area of the home 106 or motion detectors that sense movement in a region of the home 106. The home monitoring system 104 can include a set of subsystems for home automation, appliances, and electronics associated with the home 106. For example, an HVAC system can be integrated into the home monitoring system 104 such that the home monitoring system 104 can provide instructions for various settings through the controller to the HVAC system.

User device 108 and home monitoring system 104 can communicate with the tripwire geolocation system 101 via network 110. Network 110 can be configured to enable exchange of electronic communication between devices connected to the network 110. The network 110 can include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL), radio, television, cable, satellite, or any other delivery or tunneling mechanism for carrying data. Network 110 may include multiple networks or subnetworks, each of which may include, for example, a wired or wireless data pathway. Network 110 may include a circuit-switched network, a packet-switched data network, or any other network able to carry electronic communications (e.g., data or voice communications). For example, network 110 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. Network 110 may include one or more networks that include wireless data channels and wireless voice channels. Network 110 may be a wireless network, a broadband network, or a combination of networks includes a wireless network and a broadband network.

User devices 108 may include devices that host and display application 112 including an application environment. For example, a user device 108 is a mobile device that hosts one or more native applications (e.g., application 112) that includes an application interface (e.g., a graphical-user interface (GUI)) through which a user of the user device 108 may interact with the tripwire geolocation system 101 and/or the home monitoring system 104. The user device 108 may be a cellular phone or a non-cellular locally networked device with a display. The user device 108 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 108 may perform functions unrelated to the tripwire geolocation system 101, such as placing personal telephone calls, playing music, playing video, displaying pictures, browsing the Internet, maintaining an electronic calendar, etc.

User device 108 can include user application 112, through which the user 102 can interact with the tripwire geolocation system 101. The user application 112 can have access to location tracking services (e.g., a GPS) available on the user device 108 such that the user application 112 can enable and disable the location tracking services on the user device 108.

User application 112 refers to a software/firmware program running on the corresponding mobile device that enables the user interface and features described throughout, and is a system through which the tripwire geolocation system 101 may communicate with the user 102 and with location tracking services available on user device 108. The user device 108 may load or install the user application 112 based on data received over a network or data received from local media. The user application 112 runs on mobile devices platforms, such as iPhone, iPod touch, Blackberry, Google Android, Windows Mobile, etc. The one or more user devices 108 may receive the data from the tripwire geolocation system 101 through the network 110. In one example, the user application 112 enables the user device 108 to modify, accept, or decline instructions from tripwire geolocation system 101 and home 106.

In some implementations, user application 112 includes a home automation setup application 118. Home automation setup application 118 includes a graphical user interface through which a user 102 can interact with the tripwire geolocation system 101.

In some implementations, a process of the tripwire geolocation system 101 proceeds as follows: the tripwire geolocation system 101 receives a user route 122 and an action 128*a* to be executed by a subsystem 109 of a home monitoring system 104 (130). As depicted in FIG. 1A, the home automation setup application 118 includes a map view 120, where a user 102 can define/modify a user route 122. User route 122 is a path taken by the user 102 including, for example, roadways, bike lanes, sidewalk, etc. The user 102 can specify a start point 116, end point 124, and a direction of travel 126, e.g., work to home. Additionally, user 102 can specify particular roadways 127 to include in the particular route 122, and directions of travel 126 along each of the roadways 127.

In some implementations, the tripwire geolocation system 101 can generate a set of suggested routes for various forms of transit between a given start point 116 and end point 124 that are provided by a user. The user may then select one of the suggested routes and modify if needed, e.g., move a portion of the route. For example, a user may enter a start point 116 "work" and an end point 124 "home" for which the tripwire geolocation system 101 can provide multiple suggested routes each using one or more forms of transit, e.g., bike and bus, car, train, etc. The user can select a particular suggested route and modify the route, e.g., move the path of the route to include an alternate road.

User 102 can label the user route 122, e.g., "Route 410: Gym to Home" and further may specify days/times during which this route 122 is expected. For example, "Gym to Home" may be relevant in the early evenings, e.g., between 5-7 PM, on weekdays. In another example, a route 122 that defines work to home on weekdays may be different than a route that defines work to home on weekends, e.g., having different roadways 127 or different transit routes. Each of the different user-defined routes can be provided to the tripwire geolocation system 101 via user input at the home automation setup application 118.

For each user route 122, user 102 can select one or more actions to be executed by one or more subsystems 109 or sensors 107 of the home 106. In one example, a user may select "HVAC settings" 128*a* and "lights" 128*b* from a list of available actions. Actions to be executed by each selected subsystem, e.g., HVAC settings action 128*a*, can be further defined, for example, through a sub-menu (not shown).

In some implementations, for each user route 122, a user 102 can specify personalized actions to be executed by one or more subsystems 109 or sensors 107 of the home 106 in response to a particular user that is traversing the route. Multiple users associated with home 106, e.g., two residents of home 106, can each have a same route 122 but each have a different action to be executed by a subsystem 109 or sensor 107 of the home 106 in response to triggering a set of tripwires for the route. For example, a first resident of a home may want associate the route with adjusting the climate control on the HVAC system, and a second resident of the home may want to associate the route with turning on the lights and cutting off the sprinkler system. When generating the user route 122 and selecting the one or more actions, the user 102 can indicate a particular user to associate with the generated route and indicate that the one or more actions should be associated with the route for only a particular user.

In some implementations, the user application 112 is a part of a home monitoring application for the home monitoring system 104. For example, a user 102 of a user device 108 may receive alerts through an application 112 that are related to the tripwire geolocation system 101 and notifications from the home monitoring system 104 that are related to home monitoring (e.g., home security).

An amount of time for the subsystem to execute the action is determined (132). For each action 128*a*, 128*b* selected to be executed by a subsystem 109, an amount of time for the action 128*a* to be executed by the respective subsystem 109 is determined. For example, an amount of time to ramp up/down the climate control of an HVAC system can be determined, for example, by knowing a starting temperature, an end temperature, and an output of the HVAC system. Determining an amount of time for the subsystem to execute the action can utilize home settings data 114 collected by the home monitoring system 104, including patterns of usage, for the subsystem. For example, the home monitoring system 104 can track ramp up/down time for the HVAC system over a period of weeks, months, etc., for varying weather conditions and provide the collected home settings data 114 to the tripwire geolocation system 101. An amount of time for the subsystem to execute the action can be determined from manufacturer-provided data, e.g., in an operating manual. For example, an oven manufacturer can provide the information related to ramp up times to reach particular oven temperatures.

In some implementations, the amount of time for the action 128*a* to execute is variable based in part on one or more of a time of day, day of the week, or time of year. For example, cooling down home 106 in summer may take less time than heating up the home 106 in the winter. In another example, the amount of time to ramp up/down the climate control of an HVAC system may depend on time of day, where the amount of time to ramp up/down at night is less than the amount of time to ramp up/down during the day time. In another example, actions associated with a sprinkler system may be seasonal, e.g., where a sprinkler system does not run in the winter time.

Multiple candidate tripwires defined along the route are determined, where each tripwire includes a geo-located region (134). A first tripwire, e.g., tripwire A, is defined at or nearby a start point 116 of the route. Tripwire A can be located at a deviation point along of user route 122 in which a second user route that may also initiate at start point 116 will follow a different path, e.g., turn in a different direction. As such, tripwire A can be a first differentiating point that distinguishes a particular user route 122 from multiple different user routes. In other words, tripwire A can be a point along a particular route where the particular route follows a geo-path that is different from each other user-defined route. For example, two user-defined routes may start at a workplace location and travel along a same geo-path for a portion of the route, but a first user-defined route then deviates along a first route to a grocery store and a second user-defined route deviates along a second route to a home. In another example, multiple user-defined routes may start at a user's home and follow along a same geo-path through the user's neighborhood, but then each deviate along a different subsequent geo-path to different destinations.

In some implementations, a first tripwire can be set based on a point at which a user 102 engages with public transit after departing start point 116, e.g., enters a subway station, arrives at a bus stop, arrives at an airport, etc. For example, a first tripwire A can be located at a subway station near user's work.

A second candidate tripwire, e.g., tripwire B or C, can be determined based on the actions to be executed by subsystems 109 of the home monitoring system 104 and utilizing user location data 138 and/or transit data 140. Each tripwire B and/or C can be associated with one or more executable actions for respective subsystems 109, e.g., tripwire C can be associated with execution of a "turning on lights" action 128*b* at home 106 and disabling a security system at home 106. Each candidate tripwire that is associated with an executable action is determined along the user route 122 based on a determined amount of time to execute the action for the subsystem 109 and an amount of time it will take the user 102 to travel from the point of the tripwire to the end point 124. For example, tripwire A is placed along the user route 122 such that an amount of time it will take user 102 to travel from tripwire A to end point 124, e.g., to reach home 106, is approximately equivalent to an amount of time for the HVAC system of the subsystems 109 to reach climate control settings.

Determining an amount of time for the user 102 to travel from a particular point along the route 122 to another, different point can include utilizing user location data 138, where a user's location may be tracked over an extended period of time, e.g., 2 weeks, traveling along various routes 122. Average travel times can be determined from the user location data 138, where the location of tripwire B can depend on the average travel times. In some implementations, transit data 140 can be utilized to determine average travel times, e.g., average travel times on a subway train, average flight times for a particular flight, etc.

In some implementations, a location of a tripwire B can be placed such that an amount of time for a user 102 to arrive from tripwire B to end point 124 is greater than an amount of time for the subsystem 109 to execute a particular action. For example, tripwire B can be placed along user route 122 such that an approximate amount of time for user 102 to arrive from tripwire B to end point 124 is 20 minutes and an amount of time for HVAC system to achieve a particular set of climate control settings is 15 minutes. In other words, the tripwire geolocation system 101 can account for possible variations in traffic/route by placing tripwire B at a location along the route 122 that builds in a buffer of time.

In some implementations, a location of a tripwire B can be placed such that an amount of time for a user 102 to arrive from tripwire B to end point 124 is less than an amount of time for the subsystem 109 to execute a particular action. For example, tripwire B can be placed along user route 122 such that an approximate amount of time for user 102 to arrive from tripwire B to end point 124 is 5 minutes and an amount of time for an oven to preheat to a particular temperature is 10 minutes. A user may select to have the execution of an action by the subsystem to complete after the user arrives at end point 124.

The multiple tripwires for the user route are provided to the user in the user interface (136). A set of tripwires for the user route 122 are provided to the user in the home automation setup application 118 as suggested tripwires. A user 102 may accept, adjust, or delete one or more of the provided tripwires A,B,C. The user 102 can select to save the route 122 and tripwires A,B,C and add/remove the route to a database of multiple user-defined routes 142, e.g., via an interaction with element 123.

In some implementations, a user 102 may generate multiple routes 122 between a same start point 116 and end point 124, where each of the multiple routes can have a respective set of actions to be executed by subsystems 109 and/or sensors 107 of the home monitoring system 104. Each of the multiple routes 122 between the same start point 116 and end point 124 can include different modes of transit, e.g., car, bike, subway, etc., and/or can include different times of day/days of the week. For example, a first route between work and home can be generated for weekdays where the user 102 is commuting by train, and a second route between work and home can be generated for weekends where the user 102 is commuting by car.

In some implementations, home automation setup application 118 can present multiple different displayed features to a user 102 depending, for example, on a mode of transit for a particular user route 122. FIG. 1B is a schematic of an example graphical user interface for a tripwire geolocation system. As depicted in FIG. 1B, a set of possible displayed features for the home automation setup application 118 includes a transit map 150 and transit schedule 152. Transit map 150 and transit schedule 152 can be imported from a separate transit API, e.g., a municipality's public transit application, into the home automation setup application 118.

In some implementations, the home automation setup application 118 can import transit schedules and allow a user to input a start point 116, end point 124 and select an available transit route between the selected start point 116 and end point 124. The tripwire geolocation system 101 can receive the user input and generate the user route 154 from the transit schedule 152 and transit map 150.

In some implementations, the tripwire geolocation system 101 can access transit data 140 including transit schedules, average transit times, routes, etc., for determining a location for one or more tripwires D, E, F along a particular route 154. The tripwire geolocation system 101 can receive the transit data 140 and generate tripwires for a particular user route 154, where the tripwires D, E, F correspond to transit exchange points, e.g., train stations, bus stops, etc. For example, a first tripwire D can be set at the entrance to a subway station or a particular bus stop nearest to a start point 116 of the route 154.

In some implementations, a route can be defined utilizing two or more modes of transit, e.g., walking and train, where each sub-route can be defined by the user 102 with the mode of transit, and where the tripwire geolocation system 101 can determine the respective tripwires accounting for the change in mode of transit. For example, a user route can include both biking and riding a bus, where a placement of a tripwire to execute an action for a subsystem of the home monitoring system, e.g., climate control for the HVAC, can include a first time to traverse a first portion of the route by bike and a second time to traverse a second portion of the route by bus, such that the total amount of time to traverse the first and second portions between the tripwire and home 106 is greater than or approximately equal to an amount of time to execute the action by the subsystem. For example, an action is a pre-heating of an oven action that takes 15 minutes, where a total amount of time to traverse the first and second portions between the tripwire and home 106 can be, e.g., 15 minutes, 20 minutes, 17 minutes, etc.

In some implementations, a location of tripwires A-F can depend in part on real-time transit data 140 and/or user location data 138. Tripwire locations along a particular route 122 can be adjusted in real-time depending on a speed at which the user 102 is progressing along the route 122. In other words, a location of a tripwire C can be adjusted to a different geolocation based in part on an amount of time that it takes the user 102 to traverse from tripwire A to tripwire B.

In some implementations, the tripwire geolocation system 101 can gather information about the triggered tripwires, e.g., how fast the user 102 is going, and adjust the execution of an action by a subsystem 109 of the home monitoring system 104. For example, an expected time of arrival for the user 102 can be updated based on the time interval between triggering of sequential tripwires A, B such that the execution of an action, e.g., ramping up/down climate control of an HVAC system, can be adjusted, e.g., adjusting the ramping rate.

In some implementations, one or more of the tripwires for a user route can be geographically located and/or time-based. For example, tripwires can be generated based on a flight time of a flight route between a start point 116 and an end point 124, e.g., DFW to ATL, and an expected time to arrival. In this example, a tripwire to execute an action of a subsystem 109 or sensor 107 of the home monitoring system 104 can be set to trigger when the flight expected time to arrival is 15 minutes.

Figure 2B:
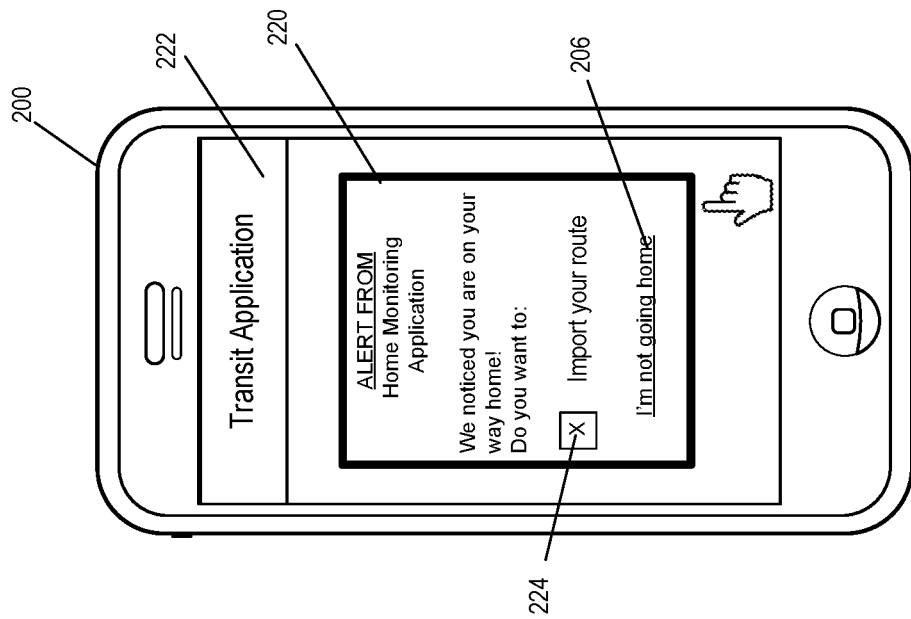
FIGS. 2A and 2B are schematics of example graphical user interfaces for a tripwire geolocation system.
Figure 2A:
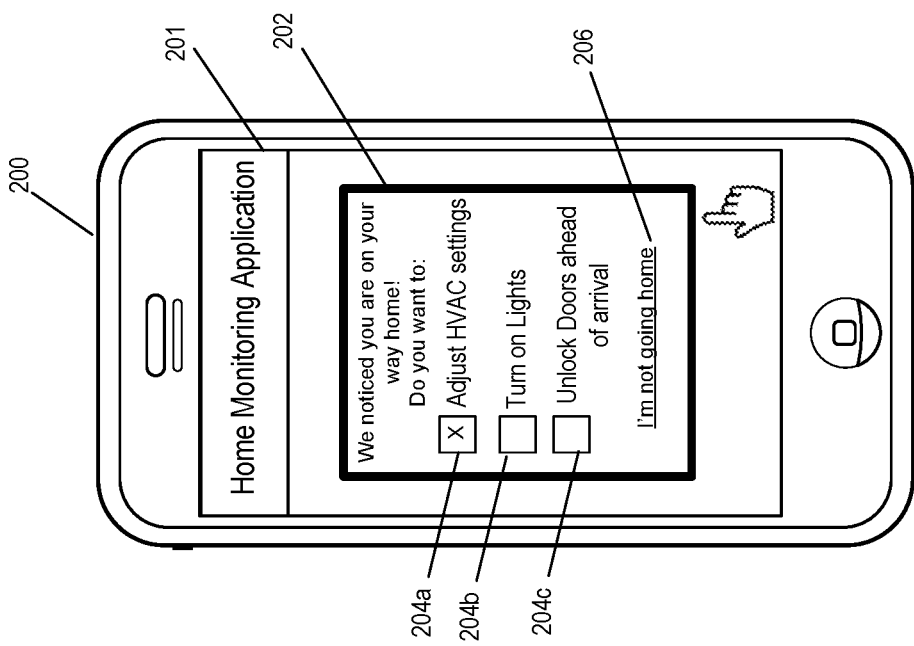

In some implementations, the tripwire geolocation system 101 can provide pop-up alerts to user 102 based on a detected route 122 that the user is determined to be on, e.g., by triggering one or more tripwires A-C. FIGS. 2A and 2B are schematics of example graphical user interfaces for a tripwire geolocation system. A user device 200 may include a home monitoring application 201 for the home monitoring system 104. A pop-up notification 202 can include a notification to the user 102 that the user is determined to be on a particular route 122 of the multiple saved routes 142. The pop-up notification 202 can request further input from user 102, e.g., to confirm the predefined set of actions to be executed by subsystems 109 or sensors 107 of the home monitoring system 104. The user 102 may further select or de-select actions to be executed by subsystems 109 or sensors 107 of the home monitoring system 104. For example, as depicted in FIG. 2A, a user is requested to confirm the action of 'adjust HVAC settings' 204a for the route. The user 102 can additionally select the actions of 'turn on lights' 204b and 'unlock doors ahead of arrival' 204c to include with this current instantiation of the route 122. The user 102 may instead select 'I'm not going home'

206 to provide the tripwire geolocation system 101 with feedback about the route through which the user is currently traveling.

In some implementations, user feedback provided to the tripwire geolocation system 101 responsive to pop-ups 202 can be utilized to update the saved routes 142, e.g., adjust the actions to be executed by subsystems 109 or sensors 107 of the home monitoring system 104. For example, a user can add "turn on lights" in response to pop-up 202 for a number of instantiations of the user traveling on user route such that the tripwire geolocation system 101 may request to update the route 122 to include the action of "turn on lights" with the route 122 automatically.

In some implementations, as depicted in FIG. 2B, a user may receive a pop-up notification 220 when a transit application 222 is active on the user device 200. The tripwire geolocation system 101 may determine that the user is on a route 154 using public transit and request permission to import the route from the transit API 222 into the tripwire geolocation system 101 in order to track the user 102 on route 154 using transit data 140. User may select element 224 to import the route from the transit API 222 to the tripwire geolocation system 101.

Figure 3:
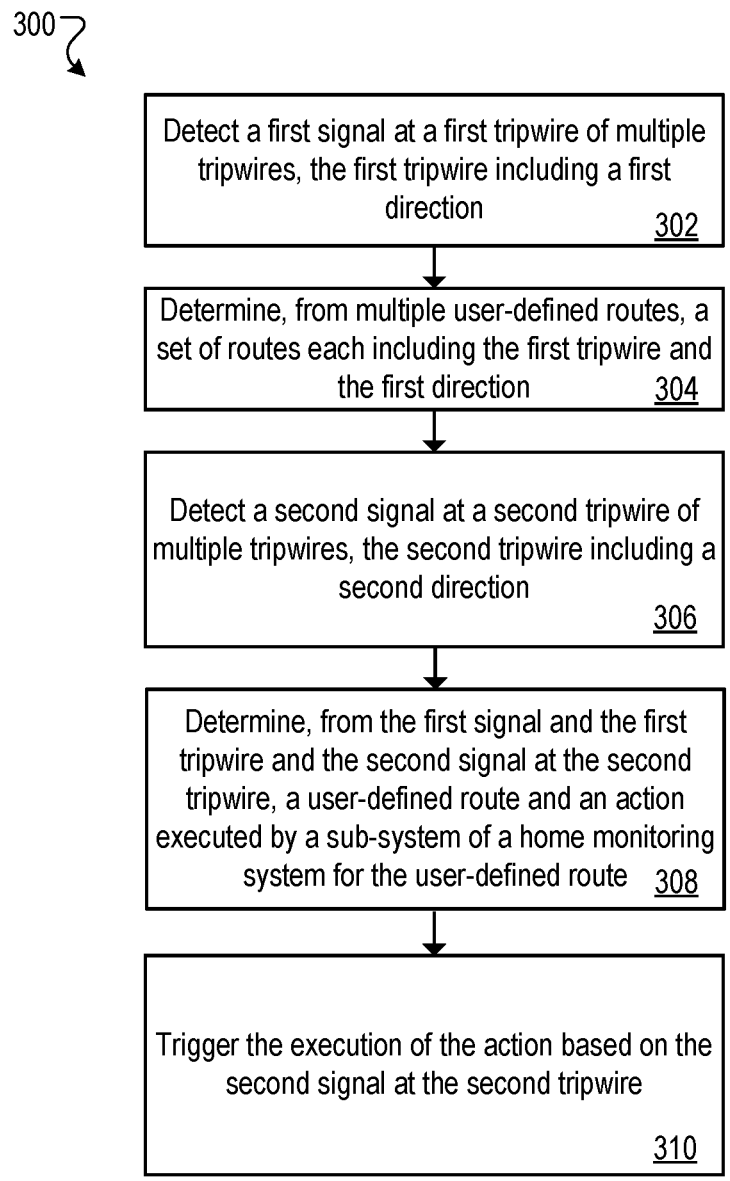
FIG. 3 is a process flow diagram of an example process for a tripwire geolocation system

FIG. 3 is a process flow diagram of an example process for a tripwire geolocation system. The processes described herein with reference to FIG. 3 can be performed by the tripwire geolocation system 101, the home monitoring system 104, a user application 112 on a user device 108, or a combination thereof, where each of the tripwire geolocation system 101, the home monitoring system 104, and the user device 108 can communication via network 110.

The tripwire geolocation system can receive multiple user-defined routes, e.g., user-defined routes 142, which are each generated as described with reference to FIG. 1 and stored in a database of user-defined routes accessible by the tripwire geolocation system 101. Each user-defined route includes a tripwire of multiple tripwires and a direction for the tripwire, e.g., a direction of travel 126. Each user-defined route of the multiple user-defined routes includes an action of multiple actions to be executed by a sub-system of a home monitoring system, e.g., subsystem 109 of a home monitoring system 104.

A first signal is detected at a first tripwire of multiple tripwires, the first tripwire including a first direction (302). A first signal can be a trigger of the tripwire corresponding to a detection of user crossing the first tripwire. Referring now to FIG. 1A, the first signal can be a detection that user 102 has crossed tripwire A along route 122. Tripwire can be, as depicted in FIG. 1A, a geolocated line across a roadway 127 where the user 102 is detected as crossing the geolocated line in a direction that is approximately orthogonal to the geolocated line.

In some implementations, a tripwire is a geolocated region that is highly localized, e.g., defined by an intersection, an area of a roadway, or the like. A first signal can correspond to a detection of the user entering the geolocated region from first side or first curvature of the geolocated region and exiting from a second side or second curvature of the geolocated region. A tripwire can have an associated direction of travel, in other words, a directionality of movement to trigger the tripwire. The direction of travel can include an order of which side or curvature of the geolocation region is entered first by the user traveling through the geolocated region. For example, a first side or first curvature of a roadway can be defined as a point of entry into the geolocated region and a second side or second curvature can be defined as a point of exit from the geolocated region, such that only movement where the first side/curvature is traversed before the second side/curvature will trigger the tripwire.

In some implementations, a direction of travel can be defined with respect to a direction that the user traverses the geolocated region. In one example, a direction of travel can be traversing an intersection in a northbound direction. In another example, a tripwire can be generated for a train station, where only eastbound train movement through the train station will trigger the tripwire.

In some implementations, a tripwire can be directionally invariant, where any movement through the tripwire will trigger the tripwire. For example, a tripwire can be a geolocated region including an intersection, where any detection of the user 102 traversing the intersection will trigger the tripwire.

Detecting that a user has crossed a tripwire can include detecting a geolocation of the user (e.g., GPS coordinates) at a first location relative to the geolocation of the tripwire at a first point in time, and detecting the geolocation of the user at a second location relative to the geolocation of the tripwire at a second, subsequent time. The first point in time and the second point in time may be within a particular period of time, e.g., 10 seconds, 360 seconds, or the like. A first location and a second location can be, for example, on either side of a line delineated by the tripwire. In another example, the first and second locations can be entering and exiting an intersections. In another example, the first and second locations can be entering and exiting a train station.

In some implementations, detecting the geolocation of the user by GPS coordinates can include providing by the user device 108, a current geolocation of the user device 108 to the tripwire geolocation system 101 at periodic intervals, e.g., every 1 minute, every 5 minutes, and the like. The current geolocation of the user device 108 can be requested by the tripwire geolocation system 101 from the user device 108 based on an estimated location of the user 102 to the tripwire A, e.g., based in part on a point in time when the user 102 was determined to be departing start point 116.

In some implementations, a user application 112 on user device 108 can access user routes 142, e.g., when the user device 108 is determined to be departing a start point 116, and compare user GPS location data from user device 108 to the user routes 142. The user device 108 can provide a user's location relative to tripwire A to the tripwire geolocation system 101.

In some implementations, detecting that the user has crossed a tripwire can include receiving transit data 140 describing the position of a particular train, subways, plane, etc., on which the user 102 is riding. For example, transit data 140 can be a real-time train schedule, where timestamps for the train location relative to the tripwire, e.g., the station, are provided to the tripwire geolocation system 101. In another example, transit data 140 is a flight-tracker where data related to real-time estimated time of arrival of the flight are provided to the tripwire geolocation system 101.

In some implementations, the tripwire geolocation system 101 can access transit data 140 describing transit routes and access a user application 112 for the transit system on which the user 102 is riding, e.g., a public transit API. The tripwire geolocation system 101 can determine, from the transit data 140 describing the transit routes and the data from the user application 112 that the user is on a particular train/plane/bus to determine when the user is crossing a particular tripwire D, as depicted in FIG. 1B.

A set of routes is determined from multiple user-defined routes, each route including the first tripwire and the first direction (304). A set of routes from multiple user routes 142 is determined where each of the routes of the set of routes includes a same first tripwire, e.g., tripwire A and a direction of travel 126. Multiple routes 142 can share a same first tripwire and direction, for example, for multiple routes all departing from a same start point 116. In one example, a as depicted in FIG. 1B, a start point 116 is a workplace for user 102, where multiple routes can be generated leaving the workplace and endings in various different locations, e.g., home, gym, grocery store. The set of routes can be determined, for example, by the tripwire geolocation system 101, from the user routes 142 and utilizing geolocation information from user device 108 and/or transit data 140. In another example, home monitoring system 104 can receive the first signal related to the triggering of a first tripwire and proceed to determine the set of routes from the user routes 142. In yet another example, a user device 108 utilizing a application 112 can determine the set of routes from the user routes 142 based on the detection of the first signal corresponding to the first tripwire.

In some implementations, multiple routes 142 can share a same first tripwire and direction as well as a same end point, but having different paths along the route, e.g., different commuting roads for particular days of the week. Multiple routes 142 can share a same first tripwire and direction but have differing modes of transportation, e.g., car commute, bike commute, or public transit commute. The tripwire geolocation system 101 selects each of the multiple routes 142 that shares at least the same first tripwire and direction.

A second signal is detected at a second tripwire of multiple tripwires, the second tripwire including a second direction (306). A second signal can be a trigger of the tripwire corresponding to a detection of user crossing a second tripwire, e.g., tripwire B. As described above, the trigger of the tripwire can include detecting a location of the user 102 traversing from a first location relative to the geolocation of the tripwire to a second location relative to the geolocation of the tripwire within a period of time. In one embodiment, a geolocation of the user device 108 can be provided to the tripwire geolocation system 101 and utilized by the system 101 to determine a location of the user 102 relative to the second tripwire, e.g., tripwire B. In another embodiment, the user device 108 can access user routes 142 and compare the geolocation of the user device 108, e.g., using GPS coordinates and/or transit data 140, to the set of routes to determine a location relative to a particular tripwire.

A user-defined route and an action executable by a subsystem of the home monitoring system for the user-defined route are determined, from the first signal at the first tripwire and the second signal at the second tripwire (308). The tripwire geolocation system 101 identifies, from the first signal at the first tripwire, e.g., crossing tripwire A, and the second signal the second tripwire, e.g., crossing tripwire B, at some subsequent point in time, that the user 102 is traversing a particular route 122 of the set of user routes 142. The system 101 may further identify the particular route 122 by an amount of time between the triggering of the first tripwire and the triggering of the second tripwire.

The tripwire geolocation system 101 identifies the particular action executable by a subsystem 109 and/or sensor 107 of the home monitoring system 104 that is associated with the particular route 122. The action, e.g., adjusting the climate control of an HVAC system, can be associate with the tripwire during the generation of the route 122, as described above with reference to FIG. 1A.

In some implementations, the first signal at the first tripwire, e.g., tripwire A, and the second signal at the second tripwire, e.g., tripwire B, are provided to the home monitoring system 104 which can identify the particular route, e.g., route 122, from the user routes 142. The home monitoring system 104 can proceed to monitor the geolocation of the user 102, e.g., by GPS data from user device 108 and/or transit data 140, to determine when to execute the action by the subsystem 109.

In some implementations, the tripwire geolocation system 101 provides a notification to the user 102, e.g., notification 202 or 220, that the system has identified a route 122 for the user and requests verification of the route and/or the action executable by the subsystem for the route.

The execution of the action is triggered based on the second signal at the second tripwire (310). The tripwire geolocation system 101 can provide the instructions to the home monitoring system 104 which includes the subsystem 109, e.g., HVAC system, smart appliances, smart television, security system, lighting system, sprinkler system, etc., which in turn will provide the instructions to the subsystem 109. In some implementations, the home monitoring system 104 receives geolocation data, e.g., GPS data and/or transit data, from user device 108 and determines when to trigger the execution of the action based on a location of the user 102 relative to the tripwires. The home monitoring system 104 can provide the instructions to the subsystem 109 to execute the action based on receiving the second signal at the second tripwire from the user device 108 and/or from the tripwire geolocation system 101.

In some implementations, the tripwire geolocation system 101 is a subsystem of the home monitoring system 104 and can provide instructions to the subsystem 109 to trigger the execution of the action. In one example, instructions can be to set one or more systems in the home to a particular preset home settings 114, e.g., setting a temperature for the HVAC system, turning a front porch light on, turning on a smart speaker in the home 106, and the like.

The subsystem 109 can receive the instructions in a form compatible with its operation, e.g., control commands for the particular subsystem, and execute the action accordingly. In one example, the action is a preheating of an oven to a particular temperature. In another example, the action is activating a sprinkler system for a particular period of time. In another example, the action is turning on a set of lights within the home 106.

In some implementations, instructions provided to the subsystem of the home monitoring system can include a delay period to wait before performing a particular function of the subsystem. For example, a delay of 30 minutes before preheating an oven. In another example, a delay of 15 minutes before unlocking a front door. A delay period can account for a user 102 switching modes of transit, e.g., getting off a subway train and walking to end point 124.

Although described with reference to FIG. 3 as a route having two tripwires, in some embodiments, multiple tripwires can be generated with a user route 122. Two or more of the multiple tripwires can each trigger an action executable by a subsystem or sensor of the home monitoring system, e.g., tripwire B can trigger an adjustment to the climate control of an HVAC system and tripwire C can trigger a change in the lighting scheme of home 106.

In some implementations, triggering an action to be executed by a subsystem 109 and/or sensor 107 of the home monitoring system 104 can include detecting triggering of two or more sequential tripwires prior to executing the action. For example, tripwires D and E must be triggered in sequence in order for an action to be executed by a subsystem, e.g., send a notification to a user's spouse.

In some implementations, the tripwire geolocation system 101 can be integrated with ridesharing application, where a user can specify routes 142 using ridesharing as the mode of transit and where particular actions are executed only when a particular route is taken between a starting point 116 and end point 124. For example, a route can be defined for a ridesharing mode of transit where actions are executed along a particular route for that mode of transit. Transit data 140 from the ridesharing API can be shared with the tripwire geolocation system 101 to locate the user in real-time and determine if the user is on the particular route in order to trigger a particular action. For example, the user can select to share transit data from a ridesharing API with the system 101 that tracks a user's location from an airport to home along a particular route to determine if the user's position is consistent with a particular route 142.

Figure 4:
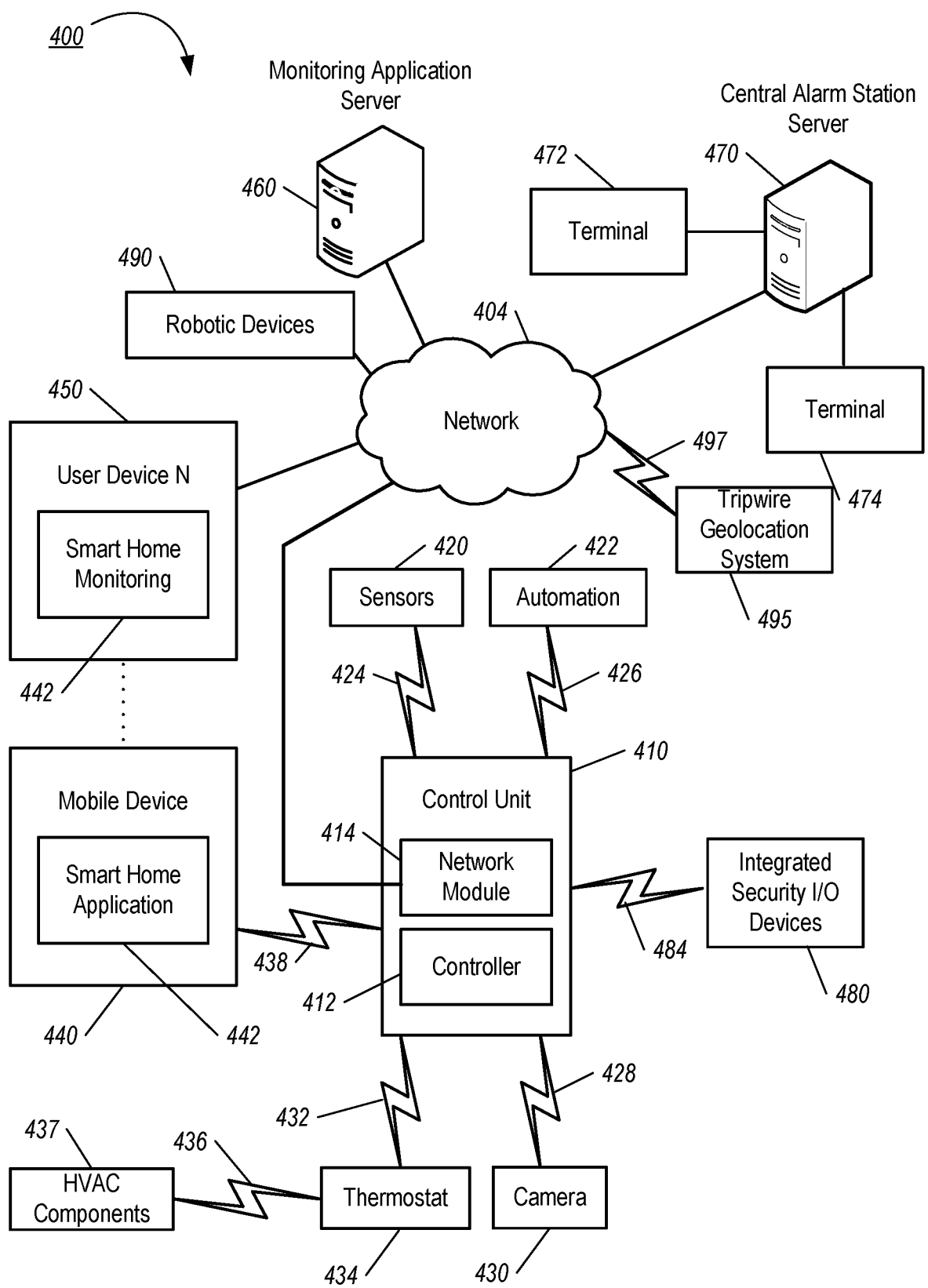
FIG. 4 shows a diagram illustrating an example home monitoring system.

FIG. 4 is a diagram illustrating an example of a home monitoring system 400. The monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the power supply of the controller 412 if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 490 may be devices that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

In addition, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events generated by the control unit 410. In this example, the monitoring server 460 may exchange electronic communications with the network module 414 included in the control unit 410 to receive information regarding events detected by the control unit 410. The monitoring server 460 also may receive information regarding events from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system 400 (e.g., user 102). For example, one or more of the sensors 420, the home automation controls 422, the camera 430, the thermostat 434, and the integrated security devices 480 can collect data related to a resident including location information (e.g., if the resident is home or is not home) and provide location information to the thermostat 434.

The central alarm station server 470 is an electronic device configured to provide alarm monitoring service by exchanging communications with the control unit 410, the one or more user devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more user devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 452. The home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 440 may be a general-purpose computer (e.g., a desktop personal computer, a workstation, or a laptop computer) that is configured to communicate with the monitoring server 460 and/or the control unit 410 over the network 405. The user device 440 may be configured to display a smart home user interface 452 that is generated by the user device 440 or generated by the monitoring server 460. For example, the user device 440 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and the robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The system 400 can further include a tripwire geolocation system 495 in communication with the control unit 410 through a communication link 497, which similarly to as described above in regards to communication links 424, 426, 428, 432, 438, and 484, may be wired or wireless and include a local network.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
receiving a plurality of user-defined routes, each user-defined route comprising a tripwire of a plurality of tripwires and a direction for the tripwire, wherein each user-defined route of the plurality of user-defined routes comprises an action of a plurality of actions executed by a sub-system of a home monitoring system;
detecting a first signal at a first tripwire of the plurality of tripwires, the first tripwire comprising a first direction;
determining, from the plurality of user-defined routes, a set of user-defined routes including the first tripwire and the first direction;
detecting a second signal at a second tripwire of the plurality of tripwires, the second tripwire including a second direction;
determining, from the first signal and the first tripwire and the second signal and the second tripwire, a particular user-defined route of the set of user-defined routes including the first tripwire and the first direction and the second tripwire and the second direction traversed by a user;

determining an action executed by the sub-system of the home monitoring system for the particular user-defined route traversed by the user; and triggering execution of the action based on the second signal at the second tripwire.

2. The method of claim 1, wherein the first tripwire comprises a first geolocated region along the particular user-defined route at a differentiating point between the particular user-defined route and a different user-defined route; and wherein the second tripwire comprises a second geolocated region along the particular user-defined route, wherein an amount of travel time for the user to traverse from the second tripwire to an endpoint of the particular user-defined route, wherein the amount of travel time corresponds to an amount of time to execute the action by the sub-system of the home monitoring system.

3. The method of claim 2, wherein determining, from the first signal and the first tripwire and the second signal and the second tripwire, the particular user-defined route of the set of user-defined routes and the action traversed by the user comprises:

determining that the first signal indicates movement through the first geolocated region defined by first tripwire in the first direction; and determining that the second signal indicated movement through the second geolocated region defined by the second tripwire in the second direction, wherein the first signal and the first tripwire and the second signal and the second tripwire define a user-defined route that is different from each other user-defined route of the plurality of user-defined routes.

4. The method of claim 3, wherein movement through the first geolocation region in the first direction comprises entering the first geolocated region from a first side or first curvature of the first geolocated region and exiting from a second side or second curvature of the first geolocated region; and wherein movement through the second geolocation region in the second direction comprises entering the second geolocated region from a third side or a third curvature of the second geolocated region and exiting from a fourth side or fourth curvature of the second geolocated region.

5. The method of claim 3, wherein the movement through the first geolocation region in the first direction comprises a directionality of movement by the user through the first geolocated region to trigger the first tripwire.

6. The method of claim 3, wherein the movement through the first geolocation region in the first direction comprises directionally invariant movement by the user through the first geolocated region to trigger the first tripwire.

7. The method of claim 3, wherein the first geolocated region and the second geolocated region comprise an intersection or an area of a roadway.

8. The method of claim 1, wherein, for a particular user-defined route comprising a particular action executed by the sub-system of the home monitoring system:

determining an amount of time to execute the particular action by the sub-system of the home monitoring system;

determining a candidate geolocated region for a particular tripwire and a direction for the particular tripwire for the particular user-defined route based on an amount of travel time from the candidate geolocated region to an end point of the particular user-defined route; and providing, to a user in a user interface, the candidate geolocated region for the particular tripwire.

9. The method of claim 8, wherein the amount of travel time from the candidate geolocated region for the particular tripwire is equal or greater than the amount of time to execute the action by the sub-system of the home monitoring system.

10. The method of claim 9, wherein determining the amount of travel time from the candidate geolocated region to the end point comprises:

collecting a plurality of travel times for the user to traverse the particular user-defined route from a start point to the end point; and determining the candidate geolocated region based on an average travel time from the candidate geolocated region to the end point along the particular user-defined route.

11. The method of claim 1, further comprising:

providing, to a user on a user device, an alert notifying the user of the execution of the action based on the second signal at the second tripwire; and receiving, from the user on the user device, user feedback in response to the alert.

12. The method of claim 1, wherein the plurality of user-defined routes comprise transit routes for public transit, and wherein the tripwire for each user-defined route comprises a transit exchange point along a particular transit route of the public transit.

13. A home monitoring system comprising:

one or more computers and one or more storage devices storing instructions that are operable, when executed by the one or more computers, to cause the one or more computers to perform operations comprising:

receiving a plurality of user-defined routes, each user-defined route comprising a tripwire of a plurality of tripwires and a direction for the tripwire, wherein each user-defined route of the plurality of user-defined routes comprises an action of a plurality of actions executed by a sub-system of a home monitoring system;

detecting a first signal at a first tripwire of the plurality of tripwires, the first tripwire comprising a first direction;

determining, from the plurality of user-defined routes, a set of user-defined routes including the first tripwire and the first direction;

detecting a second signal at a second tripwire of the plurality of tripwires, the second tripwire including a second direction;

determining, from the first signal and the first tripwire and the second signal and the second tripwire, a particular user-defined route of the set of user-defined routes including the first tripwire and the first direction and the second tripwire and the second direction traversed by a user;

determining an action executed by the sub-system of the home monitoring system for the particular user-defined route traversed by the user; and triggering execution of the action based on the second signal at the second tripwire.

14. The system of claim 13, wherein the first tripwire comprises a first geolocated region along the particular user-defined route at a differentiating point between the particular user-defined route and a different user-defined route; and wherein the second tripwire comprises a second geolocated region along the particular user-defined route, wherein an amount of travel time for the user to traverse from the second tripwire to an endpoint of the particular user-defined route, wherein the amount of travel time corresponds to an amount of time to execute the action by the sub-system of the home monitoring system.

15. The system of claim 14, wherein determining, from the first signal and the first tripwire and the second signal and the second tripwire, the particular user-defined route of the set of user-defined routes and the action traversed by the user comprises:

determining that the first signal indicates movement through the first geolocated region defined by first tripwire in the first direction; and determining that the second signal indicated movement through the second geolocated region defined by the second tripwire in the second direction, wherein the first signal and the first tripwire and the second signal and the second tripwire define a user-defined route that is different from each other user-defined route of the plurality of user-defined routes.

16. The system of claim 15, wherein movement through the first geolocation region in the first direction comprises entering the first geolocated region from a first side or first curvature of the first geolocated region and exiting from a second side or second curvature of the first geolocated region; and wherein movement through the second geolocation region in the second direction comprises entering the second geolocated region from a third side or a third curvature of the second geolocated region and exiting from a fourth side or fourth curvature of the second geolocated region.

17. The system of claim 15, wherein the movement through the first geolocation region in the first direction comprises a directionality of movement by the user through the first geolocated region to trigger the first tripwire.

18. The system of claim 15, wherein the movement through the first geolocation region in the first direction comprises directionally invariant movement by the user through the first geolocated region to trigger the first tripwire.

19. The system of claim 15, wherein the first geolocated region and the second geolocated region comprise an intersection or an area of a roadway.

20. A non-transitory computer-readable medium storing software comprising instructions executable by one or more computers which, upon such execution, cause the one or more computers to perform operations comprising:

receiving a plurality of user-defined routes, each user-defined route comprising a tripwire of a plurality of tripwires and a direction for the tripwire, wherein each user-defined route of the plurality of user-defined routes comprises an action of a plurality of actions executed by a sub-system of a home monitoring system;

detecting a first signal at a first tripwire of the plurality of tripwires, the first tripwire comprising a first direction;

determining, from the plurality of user-defined routes, a set of user-defined routes including the first tripwire and the first direction;

detecting a second signal at a second tripwire of the plurality of tripwires, the second tripwire including a second direction;

determining, from the first signal and the first tripwire and the second signal and the second tripwire, a particular user-defined route of the set of user-defined routes including the first tripwire and the first direction and the second tripwire and the second direction traversed by a user;

determining an action executed by the sub-system of the home monitoring system for the particular user-defined route traversed by the user; and triggering execution of the action based on the second signal at the second tripwire.

* * * * *